US011184328B1

(12) United States Patent
Hyder et al.

(10) Patent No.: US 11,184,328 B1
(45) Date of Patent: Nov. 23, 2021

(54) LEARNING SYSTEM FOR VIRTUAL PRIVATE NETWORK ORCHESTRATION, ANONYMIZATION AND QUALITY OF SERVICE

(71) Applicant: Malwarebytes Inc., Santa Clara, CA (US)

(72) Inventors: Adam Hyder, Cupertino, CA (US); Ravi Kalyan Namballa, Tampa, FL (US); Matthew English, San Jose, CA (US); Vijay Arumugam Velayutham, San Jose, CA (US); Motil Jayakar, Santa Clara, CA (US); Sunil Mathew Thomas, Palm Harbor, FL (US)

(73) Assignee: Malwarebytes Inc., Santa Clara, CA (US)

( * ) Notice: Subject to any disclaimer, the term of this patent is extended or adjusted under 35 U.S.C. 154(b) by 0 days.

(21) Appl. No.: 17/161,476

(22) Filed: Jan. 28, 2021

(51) Int. Cl.
*H04L 29/06* (2006.01)
*H04L 29/08* (2006.01)
*G06N 20/00* (2019.01)

(52) U.S. Cl.
CPC ......... *H04L 63/0272* (2013.01); *G06N 20/00* (2019.01); *H04L 67/141* (2013.01); *H04L 67/16* (2013.01); *H04L 67/18* (2013.01)

(58) Field of Classification Search
CPC ... H04L 63/0272; H04L 67/141; H04L 67/16; H04L 67/18; G06N 20/00; G06F 30/27
See application file for complete search history.

(56) References Cited

U.S. PATENT DOCUMENTS

| | | | |
|---|---|---|---|
| 10,127,234 B1* | 11/2018 | Krishnan | G06N 20/00 |
| 10,575,123 B1* | 2/2020 | Warr | H04W 4/029 |
| 10,846,106 B1* | 11/2020 | Curie | G06F 9/451 |
| 10,938,650 B1* | 3/2021 | Hermoni | G06N 20/00 |
| 2020/0306927 A1* | 10/2020 | Tanikella | B24B 49/006 |
| 2020/0311618 A1* | 10/2020 | Eichler | G06Q 10/02 |

* cited by examiner

*Primary Examiner* — Arvin Eskandarnia
(74) *Attorney, Agent, or Firm* — Fenwick & West LLP

(57) ABSTRACT

A security server assigns users sessions to a provider that provides virtual private networks. The security server trains a machine-learned model to identify a provider from a set of providers. The security server obtains connection parameters associated with a requested VPN connection. Connection parameters comprise a location of a computing device that requested the VPN connection, a time of the requested VPN connection, a current and/or historical state of VPN performance data, and user preferences. The security server applies the machine-learned model to the connection parameters to identify a provider. The security server provisions a user session based on the provider and establishes a connection through the provider.

20 Claims, 3 Drawing Sheets

LEARNING SYSTEM FOR VIRTUAL PRIVATE NETWORK ORCHESTRATION, ANONYMIZATION AND QUALITY OF SERVICE

FIELD OF ART

The present disclosure generally relates to accessing virtual private networks and more specifically to managing connections to a virtual private network to optimize privacy and performance.

BACKGROUND

Traditionally, a user may connect to a virtual private network (VPN) in a user session to maintain privacy of their online activities from a local network provider. However, though the virtual private network allows the user to preserve anonymity, the user's online activities from the user session may still be available to a provider of the VPN. The provider may retain and store records of the user's online activities, thus compromising the user's overall privacy.

Further, when a user requests a user session from the provider, the abilities of the VPN may be constrained by the availability and performance of the provider. For example, the user may experience issues with the virtual private network when data centers maintained by the provider are down. Additionally, if the user moves to a different geographic location further from the provider, the performance of the VPN may decrease due to lack of proximity.

SUMMARY

A method assigns users sessions to a provider of virtual private networks. The method trains a machine-learned model to identify a provider from a set of providers. The method obtains connection parameters associated with a requested VPN connection. Connection parameters comprise a location of a computing device that requested the VPN connection, a time of the requested VPN connection, a current and/or historical state of VPN performance data, and user preferences. The method applies the machine-learned model to the connection parameters to identify a selected provider. The method provisions a user session based on the selected provider and establishes a connection to the selected provider.

In another embodiment, a non-transitory computer-readable storage medium stores instructions that when executed by a processor causes the processor to execute the above-described method.

In yet another embodiment, a computer system includes a processor and a non-transitory computer-readable storage medium that stores instructions for executing the above-described method.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A security server assigns VPN user sessions to VPN providers using a machine-learned model. For a requested user session from a client device, the security server applies the machine-learned model to connection parameters related to the request to identify a provider (and, in some embodiments, a particular server associated with the provider) for the user session. The security server provisions a user session based on the identified provider and establishes a VPN for the requesting client device with the provider. Further, during the user session, if the sever running the VPN or the provider goes down, the security server may determine a new provider and/or server to connect the client device to for the user session based on availability of service at a plurality of providers and servers, geographic location of the client device, user preferences, and the like. The security server may seamlessly switch the user session between servers and/or providers to maintain the VPN from the user's perspective for the duration of the user session.

System Environment

Figure 1:
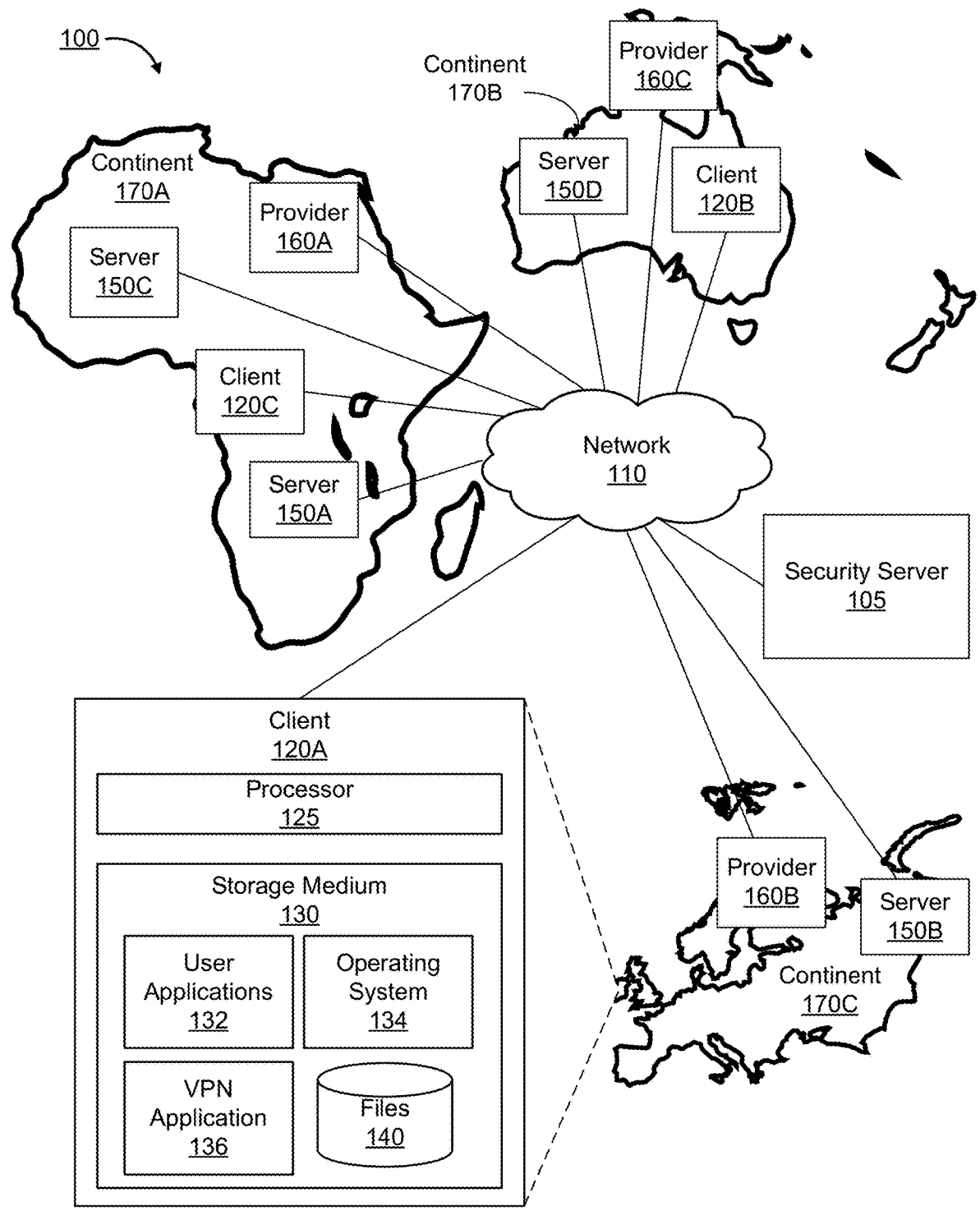
FIG. 1 is a system environment 100 for intelligently orchestrating VPN connections.

FIG. 1 is a system environment 100 for intelligently orchestrating VPN connections. The system environment 100 comprises a security server 105, a network 110, a plurality of clients 120A, 120B, 120C (also referred to as a client devices 120), a plurality of server 150A, 150B, 150C, 150D (collectively referenced as servers 150) and a plurality of providers 160A, 160B, 160C (collectively referenced as providers 160). For simplicity and clarity, only one security server 105 is shown; however, other embodiments may include different numbers of security servers 105. Furthermore, the system environment 100 may include different or additional entities, such as more or less client devices 120, servers 150, and providers 160.

The security server 105 is a computer system configured to store, receive, and transmit data to client devices 120, other servers 150, and/or providers 160 via the network 110. The security server 105 may include a singular computing system, such as a single computer, or a network of computing systems, such as a data center or a distributed computing system. The security server 105 may receive requests to establish VPN user sessions from client devices 120 and facilitate the establishment and configuration of a VPN connection between a provider 160 and a client device 120. The security server 105 may train and use a machine-learned model to identify a provider 160 and/or a specific server 150 to connect a client device 120 to for a VPN connection in response to the request. The security server 105 may furthermore facilitate switching of the connections between different providers 160 and or servers 150 during a user session according to various optimization criteria. The security server 105 is described in further detail below with reference to FIG. 2. The network 110 represents the communication pathways between the security server 105, client devices 120, servers 150, and providers 160. In one embodiment, the network 110 is the Internet. The network 110 can also utilize dedicated or private communications links that are not necessarily part of the Internet. In one embodiment, the network 110 uses standard communications technologies and/or protocols. In addition, all or some of the links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Each client device 120 comprises one or more computing devices capable of processing data as well as transmitting and receiving data via a network 110. For example, a client device 120 may be a desktop computer, a laptop computer, a mobile phone, a tablet computing device, an Internet of Things (IoT) device, or any other device having computing and data communication capabilities. Each client device (as shown for client device 120A in FIG. 1) includes a processor 125 for manipulating and processing data, and a storage medium 130 for storing data and program instructions associated with various applications. The storage medium 130 may include both volatile memory (e.g., random access memory) and non-volatile storage memory such as hard disks, flash memory, and external memory storage devices. In addition to storing program instructions, the storage medium 130 stores files 140, as well as various data associated with operation of the operating system 134 and user applications 132.

In one embodiment, the storage medium 130 comprises a non-transitory computer-readable storage medium. Various executable programs (e.g., operating system 134, user applications 132, and VPN application 136) are each embodied as computer-executable instructions stored to the non-transitory computer-readable storage medium. The instructions, when executed by the processor 125, cause the client device 120 to perform the functions attributed to the programs described herein.

The operating system 134 is a specialized program that manages computer hardware resources of the client device 120 and provides common services to the user applications 132. For example, a computer's operating system 134 may manage the processor 125, storage medium 130, or other components not illustrated in FIG. 1, such as, for example, a graphics adapter, an audio adapter, network connections, disc drives, and USB slots. A mobile phone's operating system 134 may manage the processor 125, storage medium 130, display screen, keypad, dialer, wireless network connections and the like. Because many programs and executing processes compete for the limited resources provided by the processor 125, the operating system 134 may manage the processor bandwidth and timing to each requesting process. Examples of operating systems 134 include WINDOWS, MAC OS, IOS, LINUX, UBUNTU, UNIX, and ANDROID.

The user applications 132 may include applications for performing a particular set of functions, tasks, or activities for the user. Examples of user applications 132 may include a word processor, a spreadsheet application, and a web browser. The user applications may include personal or business confidential information for communicating over the network 110, and the connections can be secured using a VPN.

The VPN application 136 is an application for facilitating a VPN through a provider 160. The VPN application 136 may connect the client device 120 to a plurality of different VPN servers 150 facilitated by different VPN providers 160 at different times. These connections may be made according to different configurations. The VPN application 136 may be managed by the security server 105 to adaptively update which providers 160, servers 150, and configuration settings are used to maintain an optimal connection. Selection of providers 160 for VPNs are intelligently managed based on a machine-learned model distributed from the security server 105, as described in relation to FIG. 2.

The providers 160 are administrative servers, including virtualized servers, that offer VPN connections to a plurality of client devices 120. A virtual private network (also referred to as a VPN or VPN connection) provides an encrypted connection of the private network (i.e., IP address space) of a client device 120 across a public network (e.g., the Internet). Use of a VPN may encrypt a user's private network use on a client device 120 and mask the IP address of the client device 120. By connecting to a VPN, a user may gain privacy and security of their data when accessing network resources (e.g., the Internet or other data) via a client device 120.

Each provider 160 is associated with a plurality of servers 150 that are operated by the provider 160 that facilitate the VPN connections of the client devices 120 via the network 110. Each server 150 may include a singular computing system, such as a single computer, or a network of computing systems, such as a data center or a distributed computing system. The servers 150 may act as proxies for the client devices 120 connected to the servers 150 via VPNs when requesting network or other data resources.

Providers 160 and servers 150 may be located in a plurality of geographic locations, as shown in FIG. 1. For example, in FIG. 1, a first provider 160A may be on a first continent 170A and a second provider 160B may be a second continent 170B. The first provider may be associated with servers 150 on the first continent 170A (e.g., server 150A and server 150C) and servers on another continent (e.g., server 150D). The second provider 160B may only be associated with servers on the second continent 170B, such as server 150B. Though FIG. 1 shows providers 160 and servers 150 displaced across several continents 170, in other embodiments, the providers 160 and servers 150 may also be displaced across a plurality of countries, states, and cities.

The security server 105 may leverage the distribution of the providers 160 and servers 150 across a plurality of geographic locations to maintain or improve quality of service for VPN connections and privacy for a plurality of client devices 120. For instance, for a particular client 120B on a particular continent 170B, a subset of the providers 160 and/or servers 150 may provide different performance for VPN connections at different times. The performance difference may depend on relative locations of the providers 160 and server 150 to the client device 120B, how the providers 160 and servers 150 are configured, current use of the providers 160 and servers 150 for other VPN connections, a time of day, occurrence of fault events (e.g., a server 150 going down), and other factors. The security server 105 uses patterns in this performance data to train a machine-learned model to intelligently select between providers 160 and/or servers 150 for VPN connections to different client devices 120 at different times.

In one example, the security server 105 may determine, based on historical performance data, that VPN connections to a first server 150D in a first continent 170B maintain a high quality of service at 9 P.M., every day, regardless of where a client device 120 of the VPN connection is in the world. Therefore, if a user session of a client device 120C has a VPN connection with a second server 150C on second continent 170A at 9 P.M. when the server 150C goes down, the security server 105 may seamlessly switch the user session to a VPN connection with the first server 150D, even if the client device 120C is located on the second continent 170A. In another example, when responding to a request for a VPN connection from a client device 120C, the security server 105 may apply a machine-learned model to current performance data of the providers 160 and servers 150 to select a provider 160 (or server 150, in some embodiments) to provision a user session to for the client device 120C. Even though provider 160A may be geographically closest to the client device 120C, the machine-learned model may output a provider 160B on another continent, due to patterns in its performance data showing that it would provide a better VPN connection to client device 120C than provider 160A. The security server 105 may establish a VPN connection between the client device 120B and a server 150B of the provider 160B.

The security server 105 may also switch VPN connections between providers 160 at various intervals for enhanced security of user sessions. Doing so prevents one provider 160 from maintaining a log of all data accessed and sent by a client device 120 during a user session, thereby protecting a user of the client device's data privacy. For example, a client device 120A may be connected to a first provider 160B for a user session. After the user session has been occurring for one hour, the security server 105 may use the machine-learned model to select a second provider 160A to provision the user session. The security server 105 disconnects the VPN connection with a server 150B of the first provider 160B and establishes a VPN connection with a server 160A of the second provider 160A. After another hour has passed in the duration of the user session, the security server 105 may use the machine-learned model to select a third provider 160C to switch the VPN connection to. The security server 105 may repeat switching providers 160 for the duration of the user session.

Security Server

Figure 2:
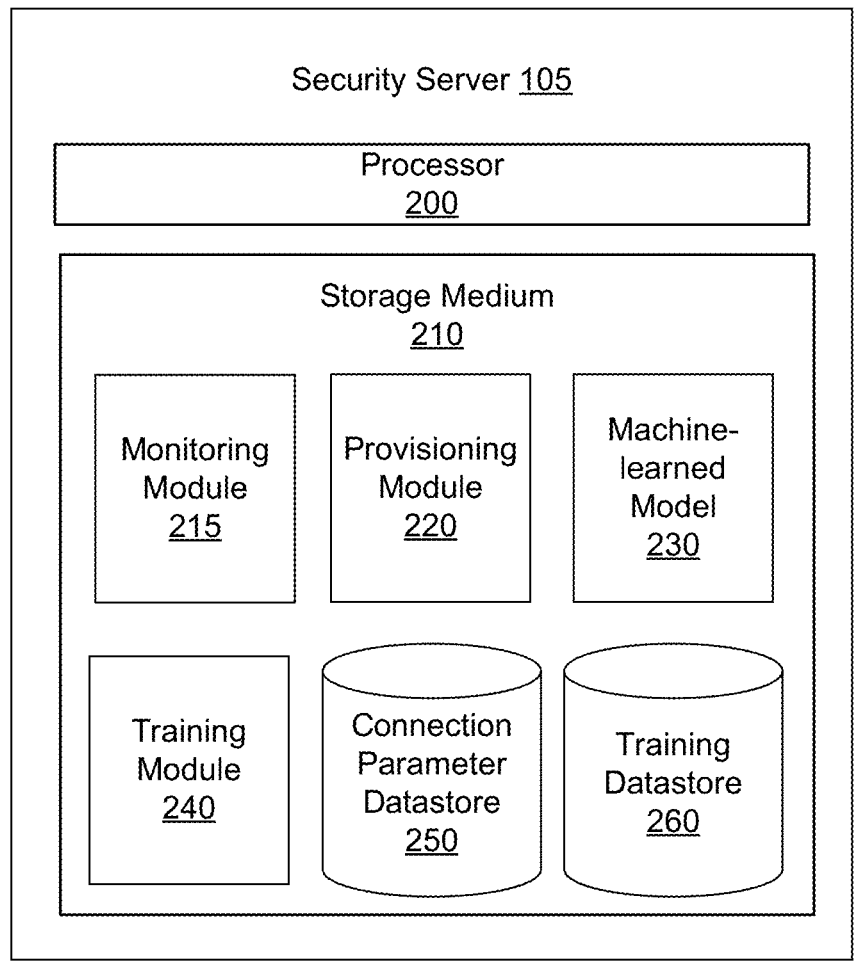
FIG. 2 is a block diagram of a security server, according to one embodiment.

FIG. 2 is a block diagram illustrating an example embodiment of a security server 105. The security server 105 includes a processor 200 for manipulating and processing data, and a storage medium 210 for storing data and program instructions associated with various modules. The storage medium 210 includes a monitoring module 215, a provisioning module 220, a machine-learned model 230, a training module 240, a connection parameter datastore 250, and training datastore 260. Alternative embodiments may include different or additional modules or omit one or more of the illustrated modules.

The processor 200 manipulates and processes data, and the storage medium 210 stores data and program instructions associated with various applications. The storage medium 210 may include both volatile memory (e.g., random access memory) and non-volatile storage memory such as hard disks, flash memory, and external memory storage devices. In addition to storing program instructions, the storage medium 210 stores various data associated with operation of the provisioning module 220, machine-learned model 230, and training module 240 and may store various files and other data.

In one embodiment, the storage medium 130 comprises a non-transitory computer-readable storage medium. Various executable programs (e.g., the provisioning module 220, machine-learned model 230, and training module 240) are each embodied as computer-executable instructions stored to the non-transitory computer-readable storage medium. The instructions, when executed by the processor 200, cause the security server 105 to perform the functions attributed to the programs described herein.

The monitoring module 215 monitors real-time data describing abilities of servers 150 connected to the security server 105. For instance, the monitoring module 215 monitors current performance data of each server 150. The current performance data include response time, round trip time, uptime, connection time, disconnection time, connection rate, disconnection rate, and bandwidth. The monitoring module 215 stores the current performance data in the connection parameter store 250 as connection parameters, and the connection parameter store 250 may include a plurality of performance data collected over time (i.e., historical performance data). The monitoring module 215 may also monitor real-time connection data describing VPN connections of client devices 120 to the security server 105, including a provider 150 of a VPN connection, a server 150 of a VPN connection, and VPN usage by time at a server 150, such as peak (e.g., when user traffic is high) patterns and off-peak (e.g., when user traffic is low) patterns at the server 150. The monitoring module 215 may receive the real-time connection data from a plurality of distributed client devices 120 maintained by the security server 105. The monitoring module 215 stores this data in the connection parameter datastore as connection parameters for each server 150.

The monitoring module 215 monitors availability data at a plurality of providers 160. The availability data describes a provider's ability to maintain VPN connections with at least a threshold service quality and VPN performance using an associated server 150. The availability data may include a number of connection licenses available and in use from each provider 160. A connection license is a contract that allows the security server 105 to facilitate VPN connections for clients 120 through a provider. Each connection license may allow a set number of VPN connections to through particular provider 160 at one time. Connection licenses may be distributed by providers 160 to the security server 105. For example, a provider 160A may allot 10 connection licenses to the security server 105, allowing the security server 105 to maintain 10 VPN connections for subscribing clients 120 through the provider 160A at one time. In some embodiments, connection licenses may be further issued at a server-level to the security server 105 (e.g., the security server 105 has 5 connection licenses through provider 160A to each of servers 150A and 150C), which may be based on physical limitations of connection capacity at each sever 150. The monitoring module 215 stores information about connection licenses from a plurality of providers 160 connected to the security server 105 in the connection parameter datastore 250 as availability data. The monitoring module 215 determines, based on VPN connections established with each provider 160, how many additional VPN connections a provider 160 could maintain based on connection licenses with the provider 160 and a current number of VPN connections being maintained by the provider 160. The monitoring module 215 stores this availability data in the connection parameter datastore 250 as connection parameters.

The provisioning module 220 uses the machine-learned model 230 to identify servers 150 for facilitating VPN connections for client devices 120. The provisioning module 220 receives requests from client devices 120 to establish VPN connections. A request indicates that a user of a client device 120 wants to establish a VPN connection in a user session, which is a time period when the client device 120 may access resources using the VPN connection. For a received request, the provisioning module 220 retrieves connection parameters from the connection parameter datastore 250. The connection parameters retrieved from the datastore 250 include data monitored by the monitoring module 215, including availability data, connection data, and current and historical performance data of servers 150 connected to the security server 105. In some embodiments, a request may include one or more connection parameters for the requested VPN connection, which the provisioning module 220 may add to the connection parameter datastore 220. The connection parameters in the request may include user preferences for the VPN connection, such as a geographic location of a server 150, a time of the requested VPN connection, and a location of the client device 120 that requested the VPN connection. The request may furthermore include connection parameters comprising general information about the client device 120 making the request, such as its identity, the identify of a user associated with the client device 120, a location of the client device 120, a configuration state of the client device 120, or other information.

The provisioning module 220 applies the machine-learned model 230 to the connection parameters to identify a selected provider 150 from a set of available providers 160 for facilitating the VPN connection. The machine-learned model 230 may be based on a classifier, neural network, regression model, or any other suitable model trained using machine learning methods. The machine-learned model 230 is trained to output, for each provider 160 available to the security server 105, a predicted performance score that represents predicted performance characteristics. The machine-learned model 230 may select an optimal VPN connection given the connection parameters based on the predicted performance score. An optimal VPN connection may output the best performance data to maintain a high quality of service and availability for the client device 120 while maintaining privacy of the client device's data. In some embodiments, the machine-learned model 230 may be additionally trained to output predicted performance scores for each server 150 of the connected providers 150, which may be used to augment the provisioning module's 220 selection of a provider 160 for the requested VPN connection. Training the machine-learned model 230 is further described with respect to the training module 240 below.

The provisioning module 220 receives outputs from the machine-learned model 230 and identifies a provider 160 based on the outputs. In particular, the provisioning module 220 may select a provider 160 with the highest predicted performance score output by the machine-learned model 230. For example, if the machine-learned model 230 outputs a predicted performance score of 90% for a first provider 160A and 76% for a second provider 160B, the provisioning module 220 would identify the first provider 160A as being optimal for the requested VPN connection based on the connection parameters. In some embodiments, the provisioning module 220 may further select a server 150 of the provider 160 based on outputs from the machine-learned model 230. For instance, the machine-learned model 230 may additionally output predicted performance scores for each server 150 of the providers 160. The provisioning module 220 may determine a subset of servers 150 that associated with the selected provider 160 and select a server 150 with the highest predicted performance score from the subset. In other embodiments, the selected provider 160 may not provide information about associated servers 150 to the security server 105, so the provision module 220 may only select the provider 160.

The provisioning module 220 provisions a user session for the requested VPN connection to the selected provider 160. For instance, the provisioning module 220 communicates with the provider 160 to indicate that the provisioning module 220 will establish a VPN connection with the client device 120A through the provider 160. The provisioning module 220 may additionally update the connection parameter datastore 250 to indicate that a license for the provider 160 is being used for the VPN connection once established.

The provisioning module 220 establishes a VPN connection between the client device 120 based on the selected provider 160. In particular, the provision module 220 may establish a VPN connection to a server 150 associated with the provider 160 for the user session and monitors the VPN connection for a duration of the user session. During the user session, the provisioning module 220 monitors whether the server 150A (or provider 160A) has gone down or is experiencing connection issues. For example, the provisioning module 220 may monitor parameters such as latency, response time, round trip times, uptime, connection time, disconnection time, connection rate, disconnection rate, and bandwidth to assess overall performance. The provisioning module 220 may furthermore track the current performance associated with the current VPN connection against predicted performances associated with other connections through different providers 160, servers 150, or different connection configurations, as may be predicted by the machine-learned model 230. The provisioning module 220 may identify when the current performance is sufficiently below a predicted performance under a different connection scheme and may automatically switch the VPN connection to a preferred connection. In an embodiment, the provisioning module 220 may multiplex the user session between different providers, servers, or configuration states to maintain an ongoing VPN session that maintains sufficiently high performance.

For instance, the provisioning module 220 may multiplex a user session between different providers 160 and/or servers 150 based on availability at the providers 160 at a current time. In one example, the client device 120A may have a VPN connection with a first provider 160A that has high availability when the VPN connection for the user session was established. However, if the provisioning module 220 determines that the first provider 160A has low availability during the user session, the provisioning module 220 may use the machine-learned model 230 to determine a second provider 160B with higher availability for facilitating the connection for the client device 120A. The provisioning module 220 may also multiplex user sessions based on quality of service and performance of the VPN connection, determined based on connection parameters monitored for the VPN connection from the monitoring module 215. Furthermore, the provisioning module 220 may switch between providers 160 or servers 150 based on a combination of two or more performance-related criteria.

The provisioning module 220 may also multiplex a user session between different providers 160 or servers 150 based on other scenarios that are not necessarily solely performance-related. For example, the provisioning module 220 may multiplex a VPN session between different providers 160 to improve privacy and security, because transmitted data is distributed between different providers 160 and servers 150. Thus, if one connection is compromised, the data may still be sufficiently secured. For example, the provisioning module 220 may attempt to switch between providers 160 and/or servers 150 at regular time intervals (e.g., every hour or every 10 minutes) or at intervals based on the amount of data transmitted (e.g., every 10 MB or every 500 kB). In an embodiment, the provisioning module 220 may switch between providers 160 or servers 150 based on a combination of performance-based and privacy-based factors.

The provisioning module 220 may multiplex user sessions seamlessly (i.e., without input from a user of the client device 120) and transition between servers 150 multiple times to maintain quality and performance of the user session. Alternatively, the provisioning module 220 may alert the user (via a notification at the client device 120) to a recommended change for the user session and switch only upon receiving confirmation from the user as input to the client device 120. In further embodiments, the provisioning module 220 may switch between a limited number of providers 160 or servers 150 that adhere to configured user constraints such as their geographic locations.

Furthermore, the provisioning module 220 may multiplex a user session between providers 160 using a technique that rotates between providers 150 each time a provider 150 requires the encryption key of the user session to rotate.

The training module 240 trains the machine-learned model 230 to predict the performance associated with facilitating a VPN connection to a client device 120 in a particular user session based on the time of day, location of the client device 120, and or other current connection parameters (e.g., user preferences, current client configuration, current connectivity states of the servers, etc.) and select the provider 160 or specific server 150 best achieving desired performance criteria. The training module 240 retrieves historical connection parameters from the connection parameter datastore 250 for each provider 160 (and in some embodiments, each server 150) and for different times and client geographic locations of VPN connections. The training module 240 stores the training data in the training data store 260. The training module 240 may update the training data as new connection parameters are added to the connection parameter datastore 250 over time.

The training module 240 trains the machine-learned model 230 based on the training data to learn correlations between the connection parameters associated with a requested VPN connection (e.g., location of client device 102, time, etc.) and observed connection parameters associated with the established connections (e.g., performance, availability, etc.). The trained machine-learned model 230 outputs predicted performance scores for each provider 160 (and in some embodiments, each server 150), which the provisioning module 220 may use to select an optimal provider 160 for a VPN connection given a set of current connection parameters. The training module may retrain the machine-learned model 230 over time as new connection parameters are stored in the connection parameter datastore 250, at set time intervals, or upon receiving a manual input from an operator of the security server 105. Such training of the machine-learned model 230 allows the machine-learned model 230 to understand patterns in VPN usage across a plurality of providers 160 and optimize VPN connections to provider high performance VPN services to client devices 120. Further, by using the connection parameters as input, the machine-learned model 230 may account for VPN performance based on current VPN connections at the providers 160. Doing so may prevent lag-time associated with the VPN connection for the user session.

In addition, since the connection parameters include data describing which providers 150 the client device 120 has been previously connected to, the machine-learned model 230 may be trained to select providers 160 in order to distribute VPN connections for the client device 120A across a plurality of providers 150 (i.e., multiplexing user sessions across providers 160). Each provider 160 may maintain a log of data accessed by the client device 120, so distributing the VPN connections across providers 160 may improve the anonymity of the client device 120 since one provider 150 would not have logged all of the client device's data usage. To further boost a user of the client device's anonymity, the machine-learned model 230 may also be trained to select providers 160 with different providers for each client device 120 associated with the user (e.g., multiplexing a user's devices between providers 160). Client devices 120 associated with the user may be in the same household as the user or across a variety of locations (i.e., home and office).

Figure 3:
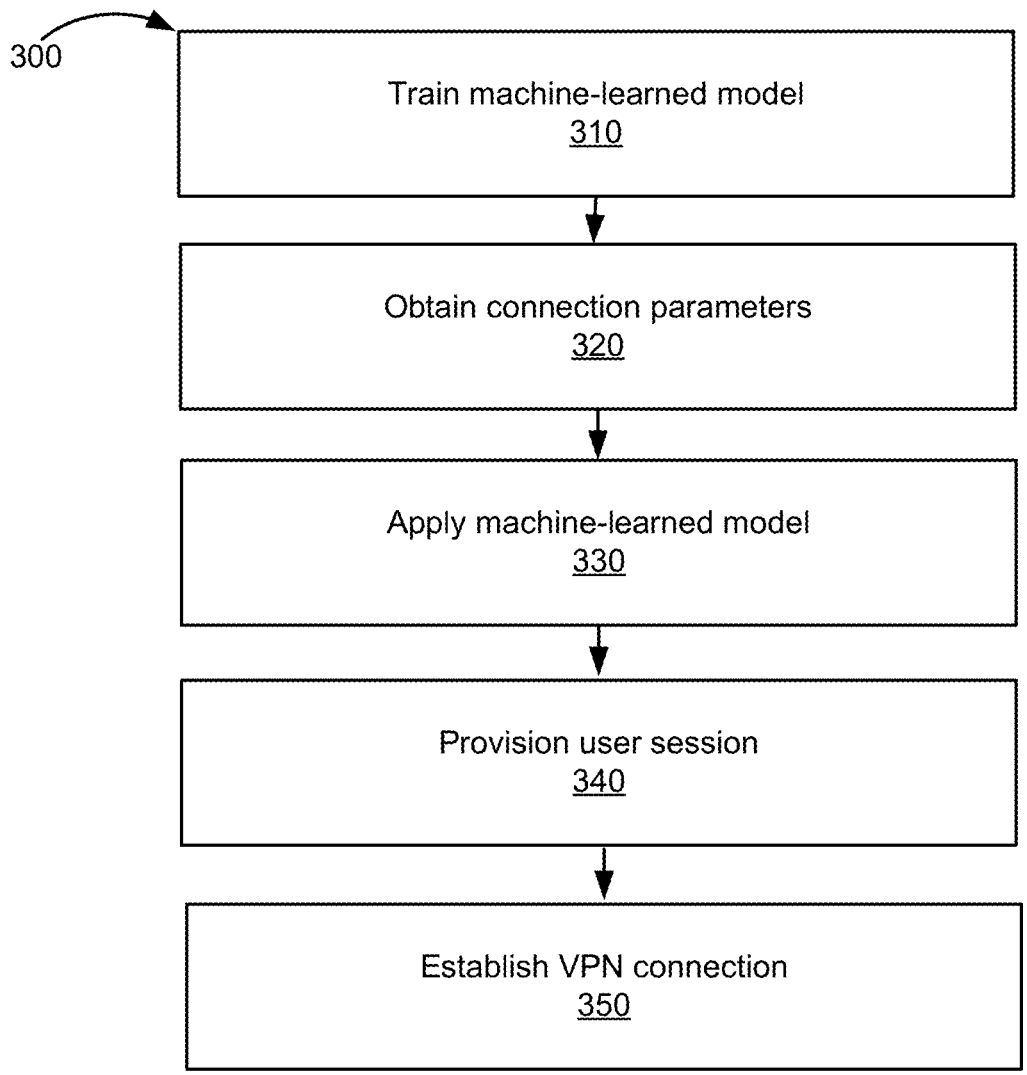
FIG. 3 is a flowchart illustrating a process for establishing a VPN connection, according to one embodiment.

FIG. 3 is a flowchart illustrating a process 300 for establishing a VPN connection, according to one embodiment. The training module 240 trains 310 the machine-learned model 230 to identify a provider 160 from a set of providers 160 for establishing a VPN connection to a client device 120. The provisioning module 220 receives a request for establishing a VPN connection to a provider 160 of a virtual private network from a client device 120. The provisioning module 220 obtains 320 connection parameters from the connection parameter datastore 250 and/or requests connection parameters from the client device 120. In some embodiments, the request from the client device 120 may include connection parameters, and the connection parameters comprise one or more of location of the client device 120, a time that client device 120 requested the VPN connection, and user preferences. The provisioning module 220 applies 330 the machine-learned model 230 to the connection parameters to identify a provider 160 from a set of providers 160 connected to the security server 105. Additionally, the provisioning module 220 may identify a server 150 associated with the identified provider 160. The provisioning module 220 provisions 340 a user session to the provider 160 and establishes 350 a VPN connection through the identified provider 160 (i.e., with the identified server 150).

In an embodiment, the client device 120A hosting the user session is connected to a first server 150A in a first geographic region and the identified provider 160A is associated with servers 150 in the first geographic region. Responsive to detecting that servers 150 in the first geographic region, including the first server 150A, are down, the provisioning module 220 may apply the machine-learned model 230 to the connection parameters to identify a second provider 160B (or second server 150B) for the user session. In some embodiments, the provisioning module 220 may apply the machine-learned model 230 to the connection parameters responsive to determining that one or more other providers 160 are predicted to provide better performance than the identified provider 160A or determining that the provisioning module 220 should rotate the user session to a different provider 160. The connection parameters may include user preferences specifying the first geographic region and second geographic region as a user's (of client device 120A) preferred geographic locations for VPN connections. The second provider 160B may be associated with servers 150 in a second geographic region different from the first geographic region. The provisioning module 220 may establish a VPN connection to the second provider 160B for the user session. In some embodiments, the provisioning module 220 may multiplex the user session between a plurality of the set of providers 160 for a duration of the user session.

In an embodiment, the user session may be associated with a user of the client device 120A. The provisioning module 220 may receive a request for a new VPN connection from a second client device 120B associated with the same user and provision a second user session to a second provider 160B of the set of providers 160. The second provider 160B may be different from the selected provider 160A. The provisioning module 220 establishes a new VPN connection between the second client device 120B and the second provider 160B.

The above-described system and processes beneficially enable better performance, availability, and anonymization of VPNs. In particular, selecting a provider 160 based on quality, performance, and availability may improve the metrics of a VPN connection and thus, improve user experience. Further, multiplexing user sessions and/or client devices between different providers 160 may improve anonymity of users of the user session and/or client devices as the users access and store data.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A computer-implemented method for assigning user sessions to a VPN service provider, the method comprising:
    training a machine-learned model to identify a VPN provider from a set of VPN providers, wherein the machine-learned model is trained on historical connection parameters for a plurality of VPN providers, times, and geographic locations of VPN connections;
    obtaining connection parameters associated with a requested VPN connection;
    applying the machine-learned model to the connection parameters to identify a selected VPN provider;
    provisioning a user session based on the selected VPN provider; and
    establishing a VPN connection to the selected VPN provider.

2. The computer-implemented method of claim 1, wherein the connection parameters comprise one or more of a location of a computing device that requested the VPN connection, a time of the requested VPN connection, a current and/or historical state of VPN performance data, and user preferences.

3. The computer-implemented method of claim 1, wherein a computing device hosting the user session is connected to a first server in a first geographic region and the selected VPN provider is associated with servers in the first geographic region, the method further comprising:
    responsive to detecting that servers in the first geographic region are down:

applying the machine-learned model to connection parameters associated with the user session to identify a second VPN provider, wherein the second VPN provider is associated with servers in a second geographic region different from the first geographic region, and establishing a second VPN connection to the second VPN provider for the user session.

4. The computer-implemented method of claim 3, wherein connection parameters associated with the user session include user preferences specifying the first geographic region and the second geographic region.

5. The computer-implemented method of claim 1, wherein a computing device hosting the user session is connected to a first server, the method further comprising:
responsive to detecting that the first server is down:
applying the machine-learned model to connection parameters associated with the user session to identify a second VPN provider, and
establishing a second VPN connection to the second VPN provider for the user session.

6. The computer-implemented method of claim 1, wherein the machine-learned model is applied to parameters comprising availability at the second VPN provider at a current time, performance at the second VPN provider at the current time, and quality of service of the second VPN provider at the current time.

7. The computer-implemented method of claim 1, wherein the user session is multiplexed between a plurality of the set of VPN providers for a duration of the user session.

8. The computer-implemented method of claim 1, wherein the user session is associated with a user and a first computing device, the method further comprising:
receiving, from a second computing device associated with the user, a request for a new VPN connection;
provisioning a second user session to a second VPN provider of the set of VPN providers, the second VPN provider different from the VPN provider; and
establishing a new VPN connection between the second computing device and the second VPN provider.

9. A non-transitory computer-readable storage medium comprising instructions executable by a processor, the instructions comprising:
instructions for training a machine-learned model to identify a VPN provider from a set of VPN providers, wherein the machine-learned model is trained on historical connection parameters for a plurality of VPN providers, times, and geographic locations of VPN connections;
instructions for obtaining connection parameters associated with a requested VPN connection;
instructions for applying the machine-learned model to the connection parameters to identify a selected VPN provider;
instructions for provisioning a user session based on the selected VPN provider; and
instructions for establishing a VPN connection to the selected VPN provider.

10. The non-transitory computer-readable storage medium of claim 9, wherein the connection parameters comprise one or more of a location of a computing device that requested the VPN connection, a time of the requested VPN connection, a current and/or historical state of VPN performance data, and user preferences.

11. The non-transitory computer-readable storage medium of claim 9, wherein a computing device hosting the user session is connected to a first server in a first geographic region and the selected VPN provider is associated with servers in the first geographic region, the instructions further comprising:
responsive to detecting that servers in the first geographic region are down:
instructions for applying the machine-learned model to connection parameters associated with the user session to identify a second VPN provider, wherein the second VPN provider is associated with servers in a second geographic region different from the first geographic region, and
instructions for establishing a second VPN connection to the second VPN provider for the user session.

12. The non-transitory computer-readable storage medium of claim 11, wherein connection parameters associated with the user session include user preferences specifying the first geographic region and the second geographic region.

13. The non-transitory computer-readable storage medium of claim 9, wherein a computing device hosting the user session is connected to a first server, the method further comprising:
responsive to detecting that the first server is down:
instructions for applying the machine-learned model to connection parameters associated with the user session to identify a second VPN provider, and
instructions for establishing a second VPN connection to the second VPN provider for the user session.

14. The non-transitory computer-readable storage medium of claim 13, wherein the machine-learned model is applied to parameters comprising availability at the second VPN provider at a current time, performance at the second VPN provider at the current time, and quality of service of the second VPN provider at the current time.

15. The non-transitory computer-readable storage medium of claim 9, wherein the user session is multiplexed between a plurality of the set of VPN providers for a duration of the user session.

16. The non-transitory computer-readable storage medium of claim 9, wherein the user session is associated with a user and a first computing device, the instructions further comprising:
instructions for receiving, from a second computing device associated with the user, a request for a new VPN connection;
instructions for provisioning a second user session to a second VPN provider of the set of VPN providers, the second VPN provider different from the VPN provider; and
instructions for establishing a new VPN connection between the second computing device and the second VPN provider.

17. A computer system comprising:
a computer processor; and
a non-transitory computer-readable storage medium storing instructions that when executed by the computer processor perform actions comprising:
training a machine-learned model to identify a VPN provider from a set of VPN providers, wherein the machine-learned model is trained on historical connection parameters for a plurality of VPN providers, times, and geographic locations of VPN connections;
obtaining connection parameters associated with a requested VPN connection;
applying the machine-learned model to the connection parameters to identify a selected VPN provider;

provisioning a user session based on the selected VPN provider; and establishing a VPN connection to the selected VPN provider.

18. The computer system of claim 17, wherein the connection parameters comprise one or more of a location of a computing device that requested the VPN connection, a time of the requested VPN connection, a current and/or historical state of VPN performance data, and user preferences.

19. The computer system of claim 17, wherein a computing device hosting the user session is connected to a first server in a first geographic region and the selected VPN provider is associated with servers in the first geographic region, the actions further comprising:

responsive to detecting that servers in the first geographic region are down:

applying the machine-learned model to connection parameters associated with the user session to identify a second VPN provider, wherein the second VPN provider is associated with servers in a second geographic region different from the first geographic region, and establishing a second VPN connection to the second VPN provider for the user session.

20. The computer system of claim 19, wherein connection parameters associated with the user session include user preferences specifying the first geographic region and the second geographic region.

* * * * *